Patented Aug. 9, 1949

2,478,627

UNITED STATES PATENT OFFICE 2,478,627

COPOLYMERS OF VINYL ACETATE, VINYL BENZOATE, AND AN ALKYL ACRYLATE

George E. Ham, Dayton, Ohio, assignor to Monsanto Chemical Company, St. Louis, Mo., a corporation of Delaware No Drawing. Application May 28, 1948, Serial No. 29,953

5 Claims. (Cl. 260—80.5)

This invention relates to new copolymers which are capable of fabrication into desirable transparent films. More particularly the invention relates to copolymers of vinyl acetate and acrylic esters which have unusual strength and flexibility.

Copolymers of vinyl acetate and vinyl benzoate are known but such compositions do not have sufficient toughness and flexibility to be useful as films unless large quantities of plasticizers are included. Copolymers of vinyl acetate and acrylic esters are known as flexible film forming compositions but they do not have desirable strength and therefore do not have broad industrial applications.

The primary purpose of this invention is to prepare novel film forming compositions having an unusual combination of high strength, flexibility and toughness. A further purpose of this invention is to provide useful copolymers of vinyl acetate, vinyl benzoate and acrylic esters which do not require plasticizers to develop the desirable properties.

It has been found that copolymers of vinyl acetate, vinyl benzoate and alkyl acrylates wherein the alkyl group has from 3 to 12 carbon atoms are very desirable compositions when copolymerized in suitable proportions. Compositions of from 30 to 80 percent of vinyl acetate, 10 to 60 percent of vinyl benzoate, and from 5 to 40 percent of the acrylic acid ester of alkyl alcohols having from 3 to 12 carbon atoms have a general utility in film fabrication. Unusually desirable films can be prepared from copolymers of 35 to 60 percent of vinyl acetate, 20 to 50 percent of vinyl benzoate, and from 10 to 30 percent of the alkyl acrylate.

The acrylic acid esters useful in the preparation of the new copolymers are isopropyl acrylate, n-hexyl acrylate, butyl acrylate, 2-ethylhexyl acrylate, lauryl acrylate, cyclohexyl acrylate, the acrylic acid esters of the mixed amyl alcohols obtained by hydrolysis of an amylene petroleum fraction, the acrylic acid esters of the mixed nonyl alcohols prepared by the polymerization of propylene and subsequent hydrolysis of the trimer, or any other acrylic acid ester of an aliphatic alcohol having 3 to 12 carbon atoms or mixture of esters including one of the said acrylic acid esters.

The new copolymers may be prepared by any of the several polymerization methods known to the art, but the emulsion polymerization method is the most effective. In the practice of the emulsion polymerization technique monomers are contacted in the presence of water which contains dissolved therein a suitable peroxy catalyst and preferably an emulsion stabilizing agent. If desired all of the monomers may be charged to the polymerization reactor at the beginning of the reaction, or they may be added periodically or gradually throughout the course of the reaction. Similarly, the catalyst and emulsifying agent may also be introduced either at the start or in increments during the reaction. The preferred method of conducting the polymerization involves the mixing of the monomers in the desired proportions and adding the mixture gradually to a reaction vessel maintained under the desired conditions for polymerization.

The emulsion polymerizations are catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compounds containing a peroxy radical. The quantity of peroxy compound may be from 0.05 to 2.0 percent by weight of the polymerizable compound. The catalyst may be charged at the beginning of the reaction or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation, it is generally desirable to promote the uniform distribution of reagents by using wetting agents, or emulsion stabilizers. Suitable agents for this purpose are the water soluble salts of fatty acids, such as sodium oleate, and potassium stearate, mixtures of water soluble fatty acid salts, such as the common soaps prepared by the saponification of animal and vegetable oils, the "amino soaps," such as triethanolamine and dodecyl methyl amine, salts of rosin acids and mixtures thereof, the water soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to 5 percent by weight of the monomers may be employed.

The emulsion polymerization reactions are conducted at temperatures between 70 and 85° C., but preferably at the reflux temperature of the emulsion. The polymerization temperatures should be maintained substantially constant, and by operation at reflux temperatures the rate of addition of the monomers may be regulated so as to maintain the temperature more nearly constant. Under such conditions the optimum quality of the product is obtained.

The reaction is preferably initiated by charging the reactor with water containing the catalyst and emulsifier in solution, and thereafter adding the monomer gradually at rates which enable the maintenance of a constant temperature. If desired the monomers may each be added in a separate stream of premixed monomer. In order to avoid unduly high concentrations of emulsifier in the reaction mass at the beginning of the reaction most of it may be mixed with the monomer and added therewith during the reaction. Preferably, only a small proportion of the catalyst is charged at the beginning of the reaction and the remainder is added either continuously or intermittently thorughout the course of the reaction. The preferred manner of operation involves heating the water containing a small amount of catalyst and emulsifier to approximately the ultimate polymerization temperature and initiating the reaction by introducing the stream of mixed monomers.

The emulsion polymerizations are conducted in glass or glass-lined vessels, which are provided with means for agitating the contents thereof. Generally, rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

The new copolymers are of particular utility in the fabrication of flexible films suitable for various wrapping applications, especially food products because of the absence of deleterious volatile plasticizers. The copolymers are also suited to compression molding methods by reasons of their toughness and tensile strength.

Further details of the practice of this invention are set forth with respect to the following specific examples.

Example 1

A 1-liter, 3-necked, round-bottom flask provided with a reflux condenser, a stirring mechanism, and a thermometer was charged with a mixture of 400 grams of distilled water, 0.05 gram of potassium persulfate and 0.4 gram of the di-2-ethylhexyl ester of sodium sulfosuccinate acid. The flask and its contents was heated to approximately 80° C. and 200 grams of a monomer mixture containing 60 percent by weight of vinyl acetate, 20 percent of vinyl benzoate, and 20 percent of butyl acrylate were added at such rate which permitted the maintenance of the temperature at 80° C. Addition of the monomer required about four hours after which the emulsion was steam distilled to remove unreacted monomers. A 100 percent yield of polymer was obtained by freezing the emulsion, filtering, and washing, followed by a direct drying operation. Strong films prepared by drying the emulsion at 50° C. were clear and colorless. Compression molded specimens were found to possess a tensile strength of 1,200 pounds per square inch, an elongation of 315 percent, and a flex temperature of 18° C. The polymer was insoluble in all common organic solvents.

Example 2

Using the procedure described in the preceding example, a mixture of 50 percent of vinyl acetate, 10 percent of vinyl benzoate, and 40 percent of butyl acrylate were copolymerized at a reaction time of three hours and at a reflux temperature of 80° C. A yield of 76 percent polymer was obtained. The clear and colorless films prepared from this resin by drying the emulsion at 50° C. had an elongation over 500 percent, and a flex temperature of — 3° C. The polymer was insoluble in all common organic solvents.

Example 3

Using the procedure of Example 1, a copolymer of 40 percent by weight of vinyl acetate, 40 percent of vinyl benzoate and 20 percent of butyl acrylate was prepared at a reaction time of 3.5 hours and temperature of 82° C. A yield of 87 percent was obtained. Analysis of recovered monomer by an infra-red technique showed 87.0 percent vinyl acetate, 13.0 percent vinyl benzoate, and 0.0 percent butyl acrylate. Compression molded specimens possessed a tensile strength of 3,540 pounds per square inch, a flexural strength of 3,700 pounds per square inch, an elongation of 230 percent, and a flex temperature of 22.5° C. The polymer is soluble in benzene, acetone, dioxine, and ethyl acetate.

Example 4

A copolymer of 30 percent of vinyl acetate, 30 percent of vinyl benzoate, and 40 percent of butyl acrylate was prepared by a method identical to that described in Example 1. A yield of 69 percent of a soft polymer was obtained after 2.5 hours reaction at 80° C. Recovered monomer analyzed as 1.2 percent butyl acrylate, 87.6 percent vinyl acetate, and 11.2 percent vinyl benzoate.

Example 5

Using the procedure of Example 1, a copolymer of 60 percent vinyl acetate, 10 percent butyl acrylate, and 30 percent vinyl benzoate was prepared in 92 percent yield at a reaction time of 3.5 hours and a temperature of 80° C. The polymer softened at 65° C. and decomposed at 50° C.

Example 6

Using the procedure of Example 1, a copolymer of 50 percent vinyl acetate, 40 percent vinyl benzoate, and 10 percent butyl acrylate was prepared in 91.1 percent yield at a reaction time of 4.5 hours and a temperature of 82° C. The polymer softened at 65° C. and decomposed at 85° C. Attempts to copolymerize a mixture of 50 percent vinyl acetate and 50 percent vinyl benzoate under similar conditions yielded no polymer. This demonstrates the unusual effect of the alkyl acrylate on the polymerizability of the vinyl benzoate.

Although the invention has been described with respect to specific embodiments, it is not intended that the details thereof shall be construed as limitations upon the scope of the invention except to the extent incorporated in the following claims.

I claim:

1. A copolymer of 30 to 80 percent of vinyl acetate, 10 to 60 percent of vinyl benzoate, and 5 to 40 percent of an alkyl acrylate wherein the alkyl group has from 3 to 12 carbon atoms.

2. A copolymer of 35 to 60 percent of vinyl acetate, 20 to 50 percent of vinyl benzoate, and from 10 to 30 percent of an alkyl acrylate wherein the alkyl group has from 3 to 12 carbon atoms.

3. A copolymer of 34 to 60 percent of vinyl acetate, from 20 to 50 percent of vinyl benzoate, and 10 to 30 percent of butyl acrylate.

4. A copolymer of 35 to 60 percent of vinyl acetate, from 20 to 50 percent of vinyl benzoate, and 10 to 30 percent of 2-ethylhexyl acrylate.

5. A copolymer of 35 to 60 percent of vinyl acetate, from 20 to 50 percent of vinyl benzoate, and 10 to 30 percent of n-hexyl acrylate.

GEORGE E. HAM.

No references cited.